March 15, 1955 R. W. WILSON 2,704,016

IMPLEMENT HITCH FOR TRACTORS

Filed Feb. 27, 1952 2 Sheets-Sheet 1

INVENTOR.
RAYMOND W. WILSON
BY W. O. Sebaich
H. P. Settle, Jr.
ATTORNEYS

March 15, 1955 R. W. WILSON 2,704,016
IMPLEMENT HITCH FOR TRACTORS
Filed Feb. 27, 1952 2 Sheets-Sheet 2
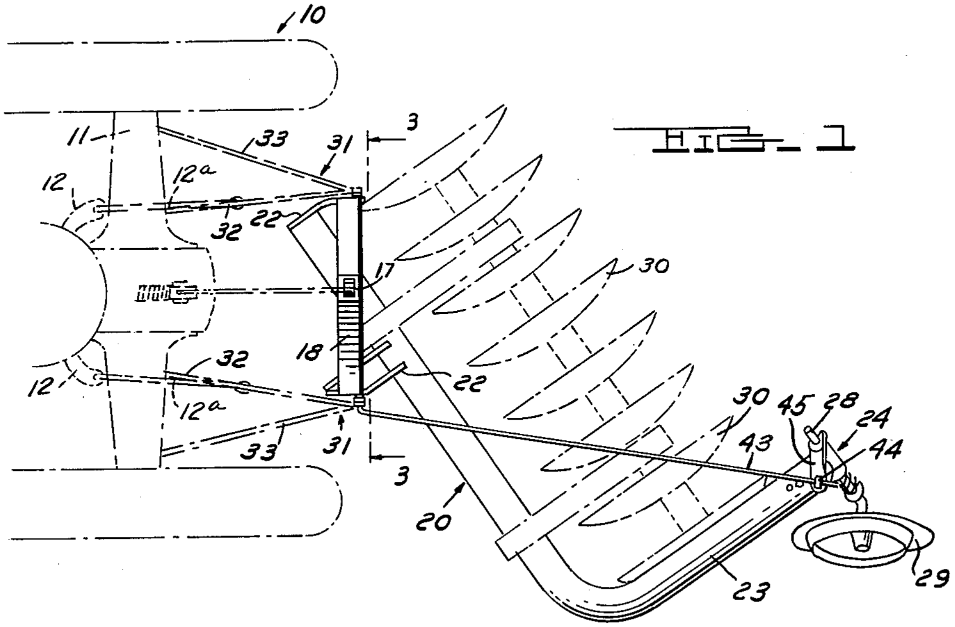
FIG. 1
FIG. 3
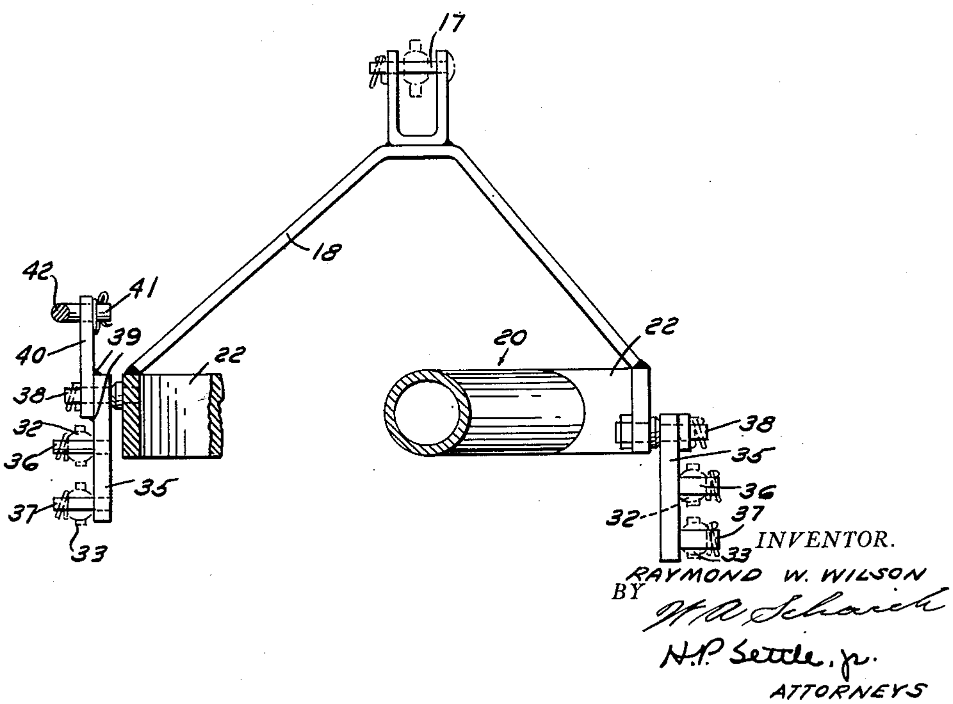
INVENTOR.
RAYMOND W. WILSON
BY
[signature]
H. P. Settle, Jr.
ATTORNEYS United States Patent Office 2,704,016

Patented Mar. 15, 1955

2,704,016

IMPLEMENT HITCH FOR TRACTORS

Raymond W. Wilson, Ferndale, Mich., assignor, by mesne assignments, to Ford Motor Company, Dearborn, Mich., a corporation of Delaware Application February 27, 1952, Serial No. 273,618

3 Claims. (Cl. 97—47.1)

The present invention relates to an implement hitch for tractors and more particularly to an improved hitch wherein relative implement-tractor movement is effective to steer the implement.

The present hitch is of the same general type as that disclosed in my earlier filed copending applications, Serial Numbers 254,368, now abandoned, and 254,369, now Patent No. 2,673,509, both filed November 1, 1951 and both assigned to the assignee of the present invention. In this type of implement hitch, the tractor-implement connection includes a pair of laterally spaced hitch links each comprising a pair of trailing link elements pivotally attached to the tractor, the link elements each being connected at their free trailing ends to a vertically extending crank arm. One end of the crank arm is connected to the implement cross shaft or other attachment member, so that relative tractor-implement movement causes the elements of each link to move in differing paths whereby the vertical crank arm is pivoted in a vertical plane. As a result of vertical pivoting of the crank arm, the effective distance between the implement attachment point and the tractor is varied, and the implement itself is steered as though it were pivoted for lateral movement about an effective steering point located in the vicinity of the tractor rear axle.

The present invention utilizes such a hitch for controlling the lateral steering of an implement as hereinbefore described and also for laterally steering an implement ground wheel, such as the trailing furrow wheel of a tillage implement, e. g., a disc tiller, a disc plow or the like. More specifically, a preferred embodiment of the present invention includes a furrow wheel steering arm movable longitudinally as a consequence of pivoting movement of the hitch linkage crank arm and connected to a furrow wheel actuating assembly for rotating the furrow wheel about a substantially vertical axis in accordance with steering of the implement by the linkage upon relative tractor-implement movement. The correlation of implement steering and furrow wheel steering made possible by this arrangement will be appreciated, since it provides means for accurately controlling the lateral positioning of the implement and the retention of the implement in accurate longitudinal or "trailing" alignment with the tractor.

It is, therefore, an important object of the present invention to provide an improved implement hitch whereby an implement ground wheel is laterally guided to facilitate the steering of the implement as a consequence of relative tractor-implement movement.

Another important object is the provision of a tractor-implement hitch linkage having laterally spaced link elements each connected to a steering crank arm and effective to steer an implement about an effective hitch point determined by the angular relationship of the elements, the crank arm also being effective to steer an implement ground wheel to laterally guide the implement in accordance with actuation of the link elements.

It is a further object of the present invention to provide an implement steering assembly including pairs of link elements connecting the tractor to an implement and effective to laterally steer the implement through crank arms attached to each of the link elements and to the tractor, the implement having a ground wheel pivotable about a vertical axis and connected to one of the linkage crank arms for steering pivotal movement in accordance with movement of the one crank arm.

Still another object is the provision of an implement hitch including a pair of laterally spaced link elements pivotally connected at their free trailing ends to a vertical crank arm having a longitudinally movable portion effective to steer a trailing ground wheel pivotally mounted on the implement.

The specific nature of this invention, as well as other objects and advantages thereof, will become apparent to those skilled in the art from the following detailed description, taken in conjunction with the attached sheets of drawings on which, by way of preferred example only, are illustrated one embodiment of this invention.

On the drawings:

Figure 1 is a plan elevational view of an implement hitch of the present invention as utilized with a one-way disc plow;

Figure 3 is an enlarged sectional view taken along the plane 3—3 of Figure 1;

As shown on the drawings:

Figure 2:
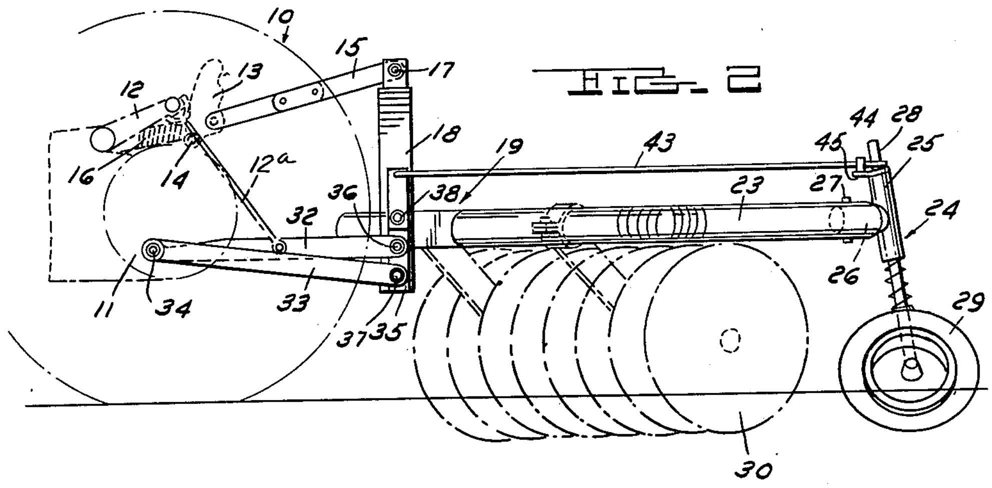
Figure 2 is a side elevational view of the hitch of Figure 1.

In Figure 1 reference numeral 10 refers generally to a tractor of well-known make, such as the Ford tractor, having a rear axle housing 11 and power liftable rock arms 12 connected to the conventional tractor hydraulic system, as is well-known in the art. The rear axle housing is surmounted by a control bracket 13 pivoted, as at 14, to the rear axle housing and pivoted to the forward end of a trailing top link 15 for reacting against an hydraulic system control spring 16. The top link trailing end is pivoted, as at 17, to the upper end of an A-frame 18 of an implement 19, such as a one way plow. The rock arms 12 carry at their rear ends depending lift arms **12*a*** actuatable by the rock arms.

The plow 19 (Figure 1) comprises a tubular main frame element 20 of generally L-shaped configuration having a forward laterally extending portion to which the A-frame 18 is attached, as by rigid mounting brackets 22. The tubular frame extends laterally beyond the tractor and terminates in an integral trailing portion 23. The rear portion 23 carries a furrow wheel assembly indicated generally at 24 and including a generally vertically extending bearing sleeve 25 (Figure 2) having a forwardly extending projection 26 telescopically received by the free end of the frame portion 23. The projection 26 is retained within the tubular frame by means of a fastening pin or the like 27 extending radially through the frame and the projection. The sleeve 23 journals a vertically extending furrow wheel stem 28 projecting axially through the sleeve and depending therebeyond to carry a furrow wheel 29. The furrow wheel 29 is positioned to run in the furrow produced by the outermost, trailing disc 30 of the plow 20 and the ground engaging wheel serves to retain the plow 20 in accurately aligned, longitudinal trailing position behind the tractor 10.

The draft connection between the tractor 10 and the plow 20 includes a pair of spaced hitch links each indicated generally at 31 and each comprising a pair of hitch link elements 32 and 33 universally pivotally connected to the rear axle housing 11 as at 34. The elements 32 are medially pivoted to the lift arms **12*a*, so as to be power liftable upon actuation of the tractor hydraulic system. The rearwardly extending link elements 32 and 33 are forwardly divergent inasmuch as the forward ends of the associated links are laterally spaced at their points of connection to the rear axle housing and the free trailing ends of the links are substantially vertically aligned for connection to a linkage crank arm 35. More specifically, the links 32 and 33 are provided with spherical-type universally pivoted attachment bearings at their rear trailing ends which receive attachment pins 36 and 37 carried by the crank arms 35 in vertically spaced relation as best seen in Figure 3. The upper end of the crank arm 35 is apertured to receive therethrough a mounting pin 38 carried by the implement A-frame 18. Thus, the pins 36 and 37 and the aperture for pin 38 are longitudinally spaced along the length of the crank arm 35**.

One of the crank arms 35 has rigidly secured thereto, as by welding indicated at 39, an upstanding steering lever 40 longitudinally aligned with the pins 36 and 37 and the pin aperture. The lever 40 is generally vertically aligned with the arm 35 but laterally offset therefrom and the lower end of the lever is apertured in alignment with the corresponding aperture of the arm 35 which receives the mounting pin 38 therethrough. The lever 40 is also apertured at its free upper end to receive therethrough a laterally displaced terminal portion 41 of a steering arm 43 extending rearwardly from the lever for passage through a pivoted clamp 44 carried by a furrow wheel steering crank 45 rigidly secured to and projecting laterally from the furrow wheel stem 28.

Figure 4:
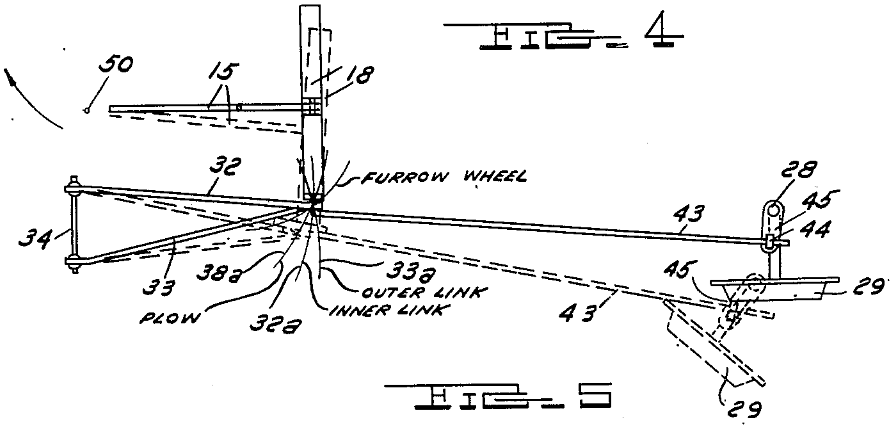
Figure 4 is a somewhat schematic plan view similar to Figure 1 and illustrating the operation of the hitch.
Figure 5:
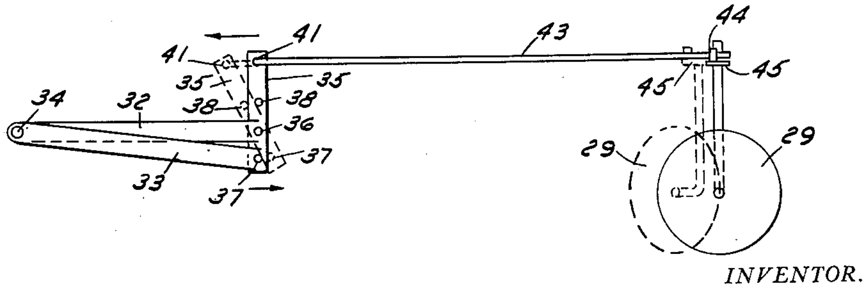
Figure 5 is a somewhat schematic side elevational view similar to Figure 4.

As has been explained in greater detail in my above identified pending applications, Serial Numbers 254,368 and 254,369, relative implement-tractor movement will cause differential movement of the link elements 32 and 33 and the pivoting of these link elements about their points of pivoted connection 34 to the tractor rear axle housing will cause movement of the vertical crank arm 35 to its dotted position of Figure 5. More specifically, the rear end of the inner link element 32 is confined to arcuate movement along the arc 32_a_ (Figure 4), while the outer link element 33 is movable at its rear end along the path of the arc 33_a_. As a result, the plow attachment pins 38 are movable along an arc 38_a_ having its effective center of pivoted movement located at the point 50 located at approximately the center of the rear axle housing 11. Accordingly, the implement A-frame and the implement 19 rigid therewith are steered as though the implement were pivoted to the point 50.

Displacement of the vertical crank arm 35 to the position illustrated in dotted outline in Figures 4 and 5 will result in the forward movement of the front end 41 of the steering arm 43 causing clockwise pivoting of the furrow wheel post 28 within the sleeve 25 to the dotted position illustrated in Figures 4 and 5. Of course, pivoting movement of the A-frame about the effective steering point 50 will result in the rear end 23 of the implement frame also being moved laterally, but the steering wheel will be actuated so as to tend to guide the rear end 23 of the implement into its proper longitudinally aligned position with the tractor 10.

Thus it will be seen that the present invention provides a means for correlating the steering of an implement and an implement ground-engaging wheel. Upon lateral displacement of the implement, as upon relative tractor-implement movement, the implement is laterally steered through the implement A-frame as though it were connected to the tractor rear axle, while the furrow wheel is steered in such a manner as to compensate for such movement and to tend to realign the implement with the tractor. In this manner, improved following of the implement is obtained, and the implement is accurately steered to follow tractor steering, the implement width of cut remains substantially constant, and the implement ground-engaging wheel is steered by the implement-tractor linkage rather than directly by the tractor. The advantages residing in the present invention will be readily appreciated by those skilled in the art and the improved correlation of implement steering and ground wheel steering will be evident.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A hitch for connecting a tractor to an implement having a steerable furrow wheel, comprising a crank arm medially pivotally attachable to the implement and projecting therefrom for angular movement, hitch elements pivotally attached to said arm in spaced relation to one another and on the same side of the medial point of attachment of said arm to the implement, said hitch elements projecting forwardly from said arm for pivotal attachment to the tractor in laterally spaced relation, whereby relative tractor-implement movement actuates said elements to effect steering of the implement by angular movement of said crank arm, and a furrow wheel steering arm pivotally attached to said crank arm in spaced relation to said point of attachment of said arm to the implement and laterally on the opposite side of said medial point from said hitch elements to project longitudinally of the implement for attachment to said furrow wheel, whereby angular movement of said crank arm about its point of attachment to the implement effects steering movement of said implement and consequently longitudinal movement of said steering arm to steer said furrow wheel.

2. In an implement for use with a tractor having laterally spaced pairs of trailing pivotal draft link elements, the elements of each pair being forwardly divergent, a rigid implement frame, a steerable furrow wheel having a substantially upright stem rotatably journaled by said frame, a pair of laterally spaced steering crank arms pivotally attached to said frame and pivotally attachable to the trailing ends of said pairs of link elements, respectively, in spaced relation longitudinally of said crank arms for angular movement upon relative tractor-implement movement, the angular movement of said crank arms effecting steering movement of said frame about a selected effective steering point, a crank secured to said wheel stem for rotating the same to steer said wheel, and means interconnecting said crank and one of said crank arms for actuating said crank as a consequence of angular movement of said crank arm.

3. The combination of claim 2 wherein the steering crank arms are angularly movable in a substantially vertical plane, a medial portion of the one of said crank arms is pivoted to the implement frame, and opposing ends of said one crank arm are connectable to said draft link elements and to said means, respectively.

References Cited in the file of this patent

UNITED STATES PATENTS

| | | |
|---|---|---|
| 688,228 | Evans | Dec. 3, 1901 |
| 1,390,578 | Nichols | Sept. 13, 1921 |
| 2,322,342 | Bunn | June 22, 1943 |
| 2,379,225 | Fraga | June 26, 1945 |
| 2,608,145 | Knapp | Aug. 26, 1952 |
| 2,635,517 | Silver et al. | Apr. 21, 1953 |